US009660440B2

(12) United States Patent
Lagnoux et al.

(10) Patent No.: US 9,660,440 B2
(45) Date of Patent: May 23, 2017

(54) DEVICE OF PROTECTION AGAINST TRANSIENT ELECTRICAL OVERVOLTAGES

(71) Applicant: ABB FRANCE, Courtaboeuf (FR)

(72) Inventors: Alain Lagnoux, Rabastens de Bigorre (FR); Michael Duval, Bagneres de Bigorre (FR); Stephane Brescon, Bagneres de Bigorre (FR)

(73) Assignee: ABB SCHWEIZ AG, Baden (CH)

(*) Notice: Subject to any disclaimer, the term of this patent is extended or adjusted under 35 U.S.C. 154(b) by 92 days.

(21) Appl. No.: 14/322,486

(22) Filed: Jul. 2, 2014

(65) Prior Publication Data

US 2015/0009596 A1 Jan. 8, 2015

(30) Foreign Application Priority Data

Jul. 3, 2013 (FR) ...................... 13 56477

(51) Int. Cl.
*H02H 1/00* (2006.01)
*H02H 9/04* (2006.01)
*H02H 9/00* (2006.01)
*H02H 3/05* (2006.01)
*H02H 3/08* (2006.01)

(52) U.S. Cl.
CPC ............ *H02H 9/042* (2013.01); *H02H 9/005* (2013.01); *H02H 3/05* (2013.01); *H02H 3/085* (2013.01)

(58) Field of Classification Search
CPC .......... H02H 3/05; H02H 3/085; H02H 9/005; H02H 9/042
USPC ..................................... 361/56, 127
See application file for complete search history.

(56) References Cited

U.S. PATENT DOCUMENTS

| | | | |
|---|---|---|---|
| 4,271,446 A | 6/1981 | Comstock | |
| 4,652,963 A * | 3/1987 | Fahlen | H02H 7/16 361/127 |
| 5,023,746 A * | 6/1991 | Epstein | H02H 9/04 361/111 |
| 2003/0151874 A1 | 8/2003 | Shipp | |
| 2008/0068027 A1* | 3/2008 | Crain | H02H 9/042 324/522 |

FOREIGN PATENT DOCUMENTS

| | | |
|---|---|---|
| EP | 0716493 A1 | 6/1996 |
| EP | 2278605 A1 | 1/2011 |
| WO | 2005039009 A2 | 4/2005 |

* cited by examiner

*Primary Examiner* — Thienvu Tran
*Assistant Examiner* — Kevin J Comber
(74) *Attorney, Agent, or Firm* — Cantor Colburn LLP

(57) ABSTRACT

A device of protection against transient electrical overvoltages, including two voltage-limiting passive components, disconnectors sensitive to the state of these components and adapted to individually disconnect each end of life component therefrom, the components are joined in parallel between a first and a second terminal of the device, where the reference voltage of the first component is inferior to the reference voltage of the second component.

10 Claims, 3 Drawing Sheets

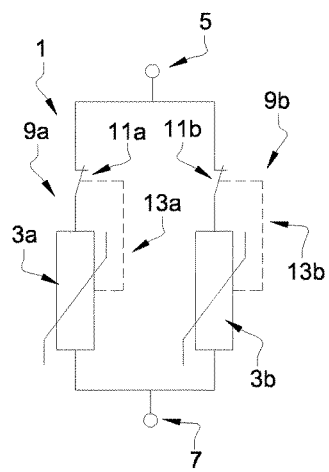
Fig. 1
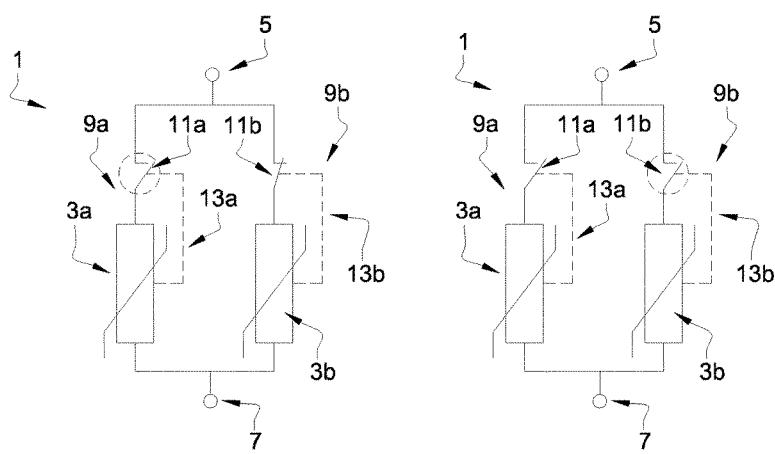
Fig. 2          Fig. 3

DEVICE OF PROTECTION AGAINST TRANSIENT ELECTRICAL OVERVOLTAGES

CROSS REFERENCE TO RELATED APPLICATION

This application is related to and claims the benefit of European Patent Application Number 13/56477 filed on 3 Jul. 2013, the contents of which are herein incorporated by reference in their entirety.

TECHNICAL FIELD

The present invention relates to a device of protection against transient electrical overvoltages.

BACKGROUND

The device is most often connected between a conductor to be protected and another conductor to be protected or to the ground. The current flowing through the device is almost zero until the voltage applied at its terminals exceeds a threshold value or reference voltage.

Beyond the threshold value, a current flows through the device in order to limit the overvoltage applied to the conductor. The current is discharged towards the ground.

The use of a device comprising two voltage-limiting passive components plugged in parallel between the terminals of the device is known from the document EP 07 16 493.

The device only requires one operational component to function. A display element reports the number of operational components. Thus, when one of the two components reaches its end of life and ceases to function, the device is still active thanks to the second component.

The device comprising a defective component must be replaced, but is still active within the time interval between the cessation of the component functioning and the replacement of the device.

This disposition greatly reduces the risk of failure of the device. However, according to the state of the art, the two components of the device are substantially identical.

Thus, the solicitation of each component is substantially the same: the risk of a simultaneous failure of the two components is to be taken into account. In fact, if the two components are defective, the device is no longer operational and plays no longer its role of protection against overvoltages.

In addition, the detection of the cessation of the functioning of a component by a user and the replacement of the device does not necessarily intervene immediately after the cessation of the component functioning.

BRIEF SUMMARY

The present invention aims to solve all or some of the drawbacks mentioned above.

In the present text, the verbs "to join", "to connect", "to link", "to power", "to associate" and their derivatives refer to an electrical communication between two distinct components.

To this end, the present invention relates to a device of protection against transient electrical overvoltages, comprising two voltage-limiting passive components, disconnectors sensitive to the state of these components and adapted to individually disconnect each end of life component therefrom, the components being joined in parallel between a first and a second terminal of the device.

The device is characterized in that the reference voltage of the first component is inferior to the reference voltage of the second component and in that the ratio of the reference voltages is inferior to 2.

According to one aspect of the invention, the ratio of the reference voltages is superior to 1.2. According to another aspect of the invention, the ratio of the reference voltages is superior to 1.4. According to one aspect of the invention, the ratio of the reference voltages is inferior to 1.6.

According to the invention dispositions, the reference voltage of the first component is inferior to the triggering threshold or the reference voltage of the second component. The device is characterized by a maximum steady state voltage inferior or equal to the reference voltage of the first component.

A ratio of the reference voltages of about 1.5 allows at the same time:
- preserving the second component when the two components are connected, and
- having a second component of a reference voltage value sufficiently low so that the device plays a role of effective protection against overvoltages when the first component is disconnected.

Thus, when a voltage applied at the terminals of the device has a value ranging between the values of the reference voltages, a major portion of the current circulates through the branch comprising the first component, while a minor portion of the current passes through the branch comprising the second component. According to an example of implementation, for a ratio of the reference voltages of about 1.5; the distribution between the branch comprising the first component and the branch comprising the second component is of about 90% and 10%.

The second component is thus little solicited as long as the first component functions. The wear of the second component is limited at the time of cessation of the first component functioning.

However, the second component remains active and fulfills its role of protection against the electrical overvoltages.

Thus, the user has a consequent time interval to replace the device after the cessation of the first component functioning.

According to one aspect of the invention, at least one of the voltage-limiting components is a varistor.

Considering the relationship between the current flowing through the varistor and the voltage applied to the terminals of the varistor, the triggering threshold delimits two functioning modes.

First, when the voltage is inferior to the triggering threshold or the maximum steady state voltage, the current is almost zero: we speak of leakage current. Second, when the voltage is superior to the triggering threshold, the current is a function of the voltage, the function being increasing and substantially affine.

According to one aspect of the invention, the first component is a varistor defined by a first characteristic of the intensity traveling over it according to the voltage between its terminals and the second component is a varistor defined by a second characteristic of the intensity traveling over it according to the voltage between its terminals.

Considering the relationship between the current flowing through each varistor and the voltage applied to the terminals of the varistors, two functioning modes are distinguished. First, when the voltage is inferior to the triggering threshold or the reference voltage of the first varistor, the current is almost zero: we speak of leakage current. Second, when the voltage is superior to the triggering threshold of the first varistor, the current is a function of the voltage, the function being increasing and substantially affine for the first varistor.

The intensity traveling over the first component is also superior to the intensity traveling over the second component.

According to one aspect of the invention, the fault detectors of the components are associated with the disconnectors.

The disconnectors are arranged to interrupt the current flow in one or other of the components when a fault is detected by a fault detector.

Beyond a certain number of solicitations, the component properties deteriorate.

According to one aspect of the invention, the disconnectors are thermal disconnectors.

A manifestation of the degradations of the properties of a component is the elevation of temperature, which may be linked for example to the flow of a significant leakage current for a voltage inferior to the triggering threshold.

According to one aspect of the invention, the disconnectors are associated with a display element, the display element being arranged to indicate the interruption of the current flow in at least one branch of the device, said at least one branch comprising one of the voltage-limiting passive components.

According to a first possibility, the interruption of the current flow by the disconnectors is reversible. This disposition allows, for example, disconnecting a branch comprising a component having an abnormal heating due to a large number of solicitations.

Preferably, the reset or the reconnection of a component may be carried out by a welding, said welding having been undone by the disconnectors during the interruption of the current flow in said component.

According to a second possibility, the disconnector of one component comprises a bimetal arranged to disconnect due to an overheating and/or a prolonged overcurrent.

The bimetal is also arranged to automatically reconnect when the component returns to a normal temperature.

According to a third possibility, the interruption of the current flow by a disconnector is irreversible.

The interruption of the current flow in one of the branches means the cessation of the component functioning comprised in this branch.

According to one aspect of the invention, the display element is arranged to indicate an interruption of the current flow in the two components of the device.

The cessation of the functioning of one of the two components is an indication prompting the replacement of the device by a device of the same new type. However, the device is still functional.

According to one aspect of the invention, the display element is arranged to indicate an interruption of the current flow in the two branches comprising the voltage-limiting passive components.

Preferably, the display element comprises visual indicators.

According to one aspect of the invention, the disconnectors are associated with remote warning units arranged to indicate an interruption of the current flow in at least one of the two branches comprising voltage-limiting passive components.

The remote warning units are arranged to transmit a message indicating the number of operational components to a remote receiver apparatus according to a wired and/or a wireless communication protocol.

According to one aspect of the invention, the device further comprises an arrangement for adjusting the current unbalance between a first branch comprising the first voltage-limiting passive component and a second branch comprising the second voltage-limiting passive component, the first and the second branches being joined in parallel between the first and the second terminals of the device.

According to one aspect of the invention, the arrangement for adjusting the unbalance comprises at least one resistive element arranged at one of the branches of the device between the first and the second terminal of the device.

According to one aspect of the invention, the device further comprises a capacitor joined between the first and the second terminals of the device.

The capacitor is arranged to limit, at the disconnection time of a passive component, the risk of forming an electrical arc at the disconnectors of said passive component.

According to another aspect of the invention, the device further comprises two capacitors, each capacitor being joined to a branch in parallel to a disconnector.

BRIEF DESCRIPTION OF THE DRAWINGS

In any case, the invention will be better understood with the following description with reference to the accompanying schematic drawings showing, by way of non-limiting example, one embodiment of this device.

FIG. 1 is an electrical diagram of the device comprising two voltage-limiting passive components, according to a first embodiment.

FIG. 2 is an electrical diagram of the device comprising a stopped component, according to the first embodiment.

FIG. 3 is an electrical diagram comprising two stopped components according to the first embodiment.

DETAILED DESCRIPTION

Figure 4:
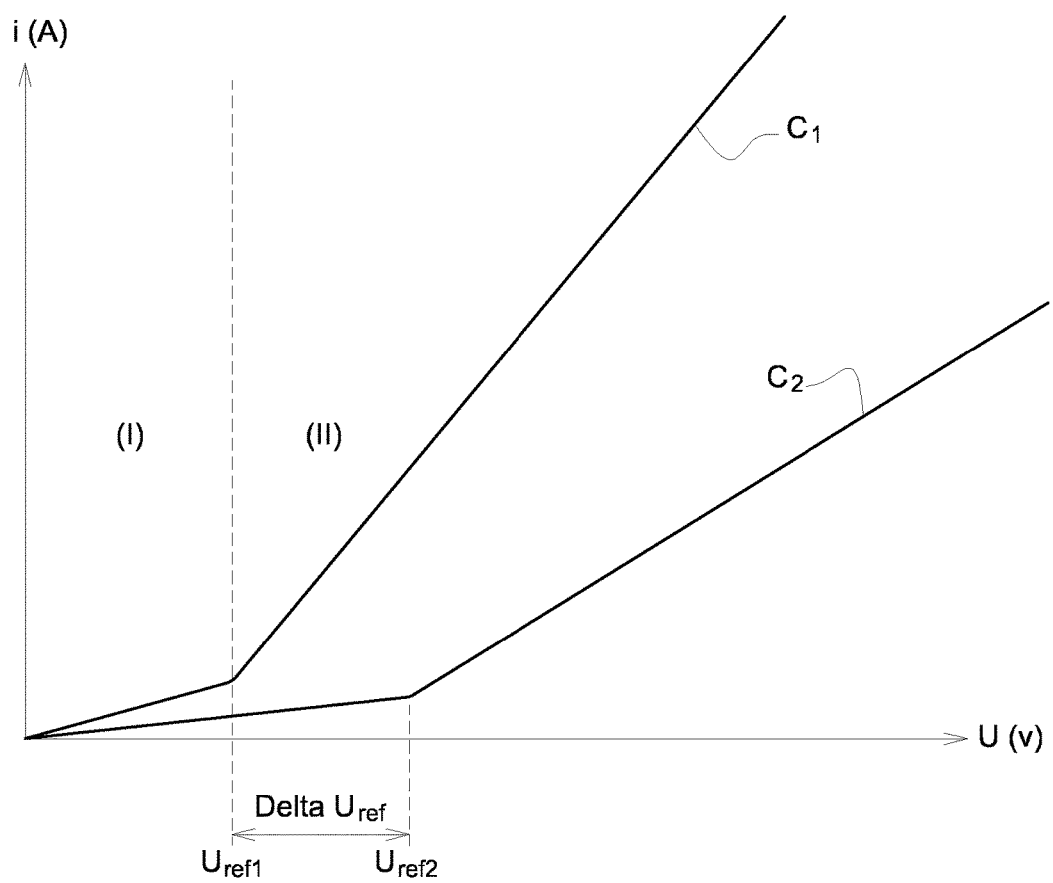
FIG. 4 is a representation of the characteristics of the intensity according to the voltage of the two components of the device, according to the first embodiment.

As illustrated in FIG. 1 and according to a first embodiment, a device 1 of protection against transient electrical overvoltages comprises two voltage-limiting passive components.

According to a first embodiment, the passive components are varistors 3a, 3b are plugged in parallel between the first terminal 5 and the second terminal 7 of the device 1.

Each branch 9a, 9b comprises a varistor 3a, 3b. A disconnector of the current is joined in series on each branch, each disconnector being arranged to open a branch 9a, 9b.

Fault detectors are associated with the disconnectors for controlling the opening of the corresponding branch 9a, 9b.

According to the first embodiment, the disconnectors are thermal disconnectors 11a, 11b. The fault detectors include each a contact 13a, 13b, with the varistor 3a, 3b. The fault detectors are arranged to react to the temperature of varistors 3a, 3b.

According to alternatives of the first embodiment, the disconnectors can also be fuses or disconnecting devices provided with bimetals.

The thermal disconnector 11a, 11b is in a closed position by default and opens when the temperature of the varistor 3a, 3b exceeds a limit value. Whether the opening is final or not depends on the chosen technology.

The increase of the temperature of the varistor 3a, 3b is related to the degradation of its properties. When a temperature limit value is reached, the varistor 3a, 3b is no longer functional.

As illustrated in FIG. 4, the first 3a and the second 3b varistors have voltage-intensity characteristics C1, C2 respectively different.

The reference voltage Uref1 of the first varistor 3a is inferior to the reference voltage Uref2 of the second varistor 3b: the gap of these two reference voltage values is of Delta Uref=Uref2−Uref1.

In a first portion of the graph I, the voltage U(V) is inferior to the reference voltage Uref1 and the characteristics C1 and C2 have an intensity i(A) substantially zero.

In a second portion of the graph II, the voltage U(V) is superior to the reference voltage Uref1, the characteristic C1 has an increasing intensity i(A) according to a substantially affine function of the voltage U(V). Similarly, the characteristic C2 has an increasing intensity i(A) according to a substantially affine function of the voltage U(V) from a voltage value U(V) equal to Uref2.

In the second portion of the graph II, the characteristics C1 and C2 have a gap increasing with intensity, the characteristic C2 having a voltage superior to the characteristic C1.

As illustrated in FIGS. 1 to 3, the device 1 has a plurality of functioning sequences according to a chronological order corresponding to FIGS. 1, 2 and 3.

FIG. 1 shows a device comprising the two varistors 3a, 3b adapted to function, since the thermal disconnectors 11a, 11b are closed. The display element reports this situation. According to the first embodiment, the display element comprises two visual indicators of green color.

When the device 1 is subjected to an overvoltage the value of which ranges between Uref1 and Uref2, the current flows through the device essentially by the branch comprising the first varistor 3a.

In fact, as shown in FIG. 4, the intensity of the characteristic C2 is negligible compared with the intensity of the characteristic C1 for a voltage ranging between Uref1 and Uref2.

Similarly, for a voltage superior to Uref2, the intensity flowing through the first varistor 3a is superior to the second intensity flowing through the second varistor 3b.

Thus, the solicitation of the first varistor 3a is superior to the solicitation of the second varistor 3b. On average, the first varistor 3a is solicited by 90% and the second varistor 3b by 10%.

FIG. 2 shows a device 1 comprising the first varistor 3a unable to function because the thermal disconnector 11a is opened. The second varistor 3b is able to function. The display element reports this situation. According to the first embodiment, the display elements are two visual indicators, the first relating to the state of the first varistor 3a being red, the second relating to the state of the second one 3b being green.

According to the first embodiment, the device is also provided with remote warning units of the number of the operational components.

The remote warning units are arranged to transmit a message indicating the number of operational components to a remote receiver apparatus according to a wired and/or wireless communication protocol.

FIG. 2 shows the second functioning sequence, following the first one shown in FIG. 1. The first varistor 3a is disconnected from the circuit and only the second varistor 3b is able to be traversed by a current in case of overvoltage superior to Uref2.

The red and the green visual indicators signal to the user that the device 1 must be replaced by a new similar device comprising two varistors adapted to be traversed by a current. In this case, the new device has a functioning according to the first sequence, as shown in FIG. 1.

If the device 1 is not replaced, a fault of the second varistor 3b is likely to appear.

FIG. 3 shows a third functioning sequence succeeding the second functioning sequence shown in FIG. 2. The device 1 comprises the two varistors 3a, 3b unable to function. In this case, the two visual indicators are of red color, signaling the fault of both varistors 3a, 3b and the non-functioning of the device.

The second varistor 3b was little solicited during the first functioning sequence due to its oversize compared to the first varistor 3a. The occurrence of a fault in the second varistor 3b leaves a sufficiently long time for the user to change the device 1 before the device 1 goes from the second to the third sequence.

Figure 5:
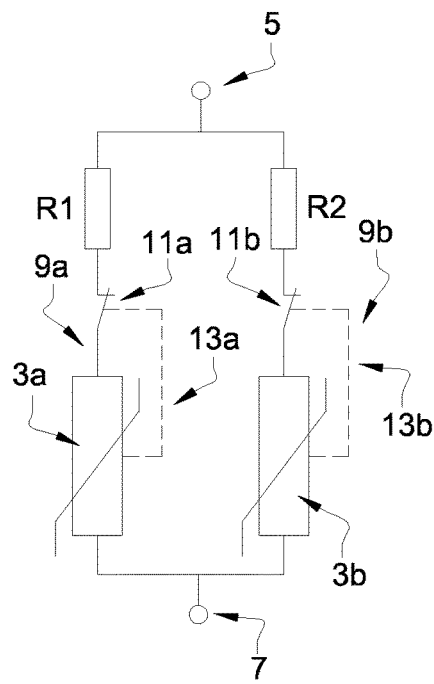
FIG. 5 is an electrical diagram of a device comprising additional passive elements of resistance type, according to a second embodiment.

FIG. 5 illustrates a second embodiment, in which a resistor R1 is attached to the first branch 9a of the circuit and a second resistor R2 is attached to the second branch 9b of the circuit.

The values of the resistors R1 and R2 are determined to allow an accurate adjustment of the imbalance of the branches. The adjustment comprises obtaining, for each branch, a characteristic of the intensity flowing through it depending on the voltage applied between the first terminal 5 and the second terminal 7. Thus, the addition of the resistors R1 and R2 to the device allows an adjustment of the curves C1 and C2 shown in FIG. 4, the new obtained curves (not shown) each characterizing a branch 9a, 9b.

Figure 6:
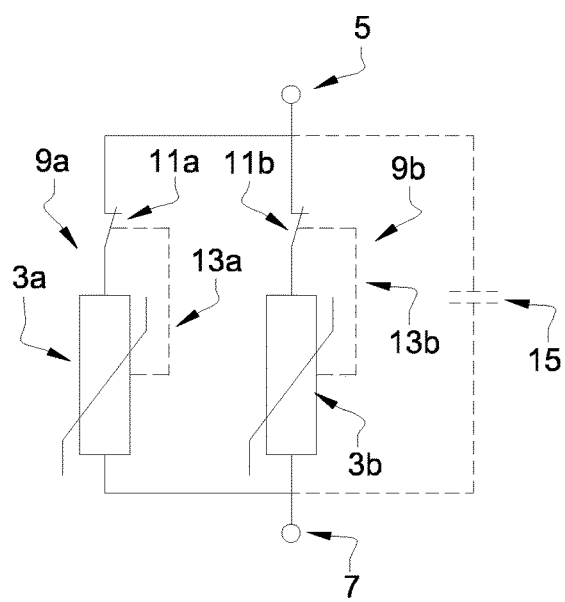
FIG. 6 is an electrical diagram of a device comprising a capacitor according to a third embodiment.

FIG. 6 illustrates a third embodiment, in which a capacitor 15 is plugged in parallel to the first 9a and the second 9b branches between the first 5 and the second terminal 7.

The addition of the capacitor 15 to the circuit has the effect of limiting the formation of an electrical arc at a thermal disconnector 11a, 11b at its disconnection time.

Figure 7:
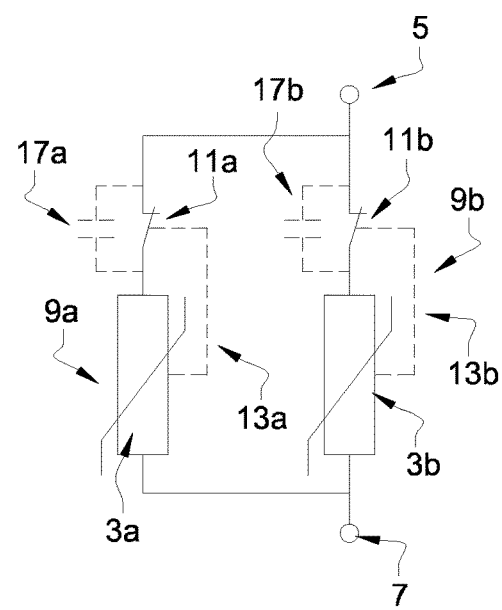
FIG. 7 is an electrical diagram of a device comprising a capacitor according to a fourth embodiment.

FIG. 7 illustrates a fourth embodiment, in which each branch 9a, 9b comprises a capacitor 17a, 17b joined in parallel of the thermal disconnector 11a, 11b of said branch 9a, 9b.

Just like for the third embodiment, the presence of the capacitors 17a, 17b has the role of limiting the formation of an electrical arc at a thermal disconnector 11a, 11b at its disconnection time.

It goes without saying that the invention is not limited to the sole embodiment of this device, described above as an example, it rather encompasses all the alternative embodiments.

The invention claimed is:

1. A device of protection against transient electrical overvoltages, comprising:
   two voltage-limiting passive components,
   disconnectors sensitive to a state of the components and adapted to individually disconnect each end of life component therefrom, wherein the components are joined in parallel between a first and a second terminal of the device, wherein a reference voltage of the first component is inferior to a reference voltage of the second component, and wherein a ratio of the reference voltages is inferior to 2 and wherein, for a voltage applied between the first terminal and the second terminal exceeding the reference voltage of the first component, the current flowing through the first component is greater than the current flowing through the second component and the difference between the current flowing through the first component and the current flowing through the second component is increasing when the voltage applied between the first terminal and the second terminal is increasing.

2. The device according to claim 1, wherein at least one of the voltage-limiting components is a varistor.

3. The device according to claim 1, wherein the disconnectors are associated with a display element, the display element being arranged to indicate an interruption of the current flow in at least one branch of the device, said at least one branch comprising one of the voltage-limiting passive components.

4. The device according to claim 3, wherein the display element is arranged to indicate an interruption of the current flow in the two branches comprising the voltage-limiting passive components.

5. The device according to claim 1, wherein the disconnectors are associated with remote warning units arranged to indicate an interruption of the current flow in at least one of the two branches comprising the voltage-limiting passive components.

6. The device according to claim 1, further comprising an arrangement for adjusting a current unbalance between a first branch comprising the first voltage-limiting passive component and a second branch comprising the second passive limiting-voltage component, the first and the second branches being joined in parallel between the first and the second terminals of the device.

7. The device according to claim 6, wherein the arrangement for adjusting the unbalance comprises at least one resistive element arranged in one of the branches of the device between the first and the second terminals of the device.

8. The device according to claim 1 further comprising a capacitor joined between the first and the second terminals of the device.

9. A device of protection against transient electrical overvoltages, comprising:

two voltage-limiting passive components, disconnectors sensitive to a state of the components and adapted to individually disconnect each end of life component therefrom, wherein the components are joined in parallel between a first and a second terminal of the device, wherein a reference voltage of the first component is inferior to a reference voltage of the second component, and wherein the ratio of the reference voltages is inferior to 2 and superior to 1.2, and wherein, for a voltage applied between the first terminal and the second terminal exceeding the reference voltage of the first component, the current flowing through the first component is greater than the current flowing through the second component and the difference between the current flowing through the first component and the current flowing through the second component is increasing when the voltage applied between the first terminal and the second terminal is increasing.

10. A device of protection against transient electrical overvoltages, comprising:

two voltage-limiting passive components, disconnectors sensitive to a state of the components and adapted to individually disconnect each end of life component therefrom, wherein the components are joined in parallel between a first and a second terminal of the device, wherein a reference voltage of the first component is inferior to a reference voltage of the second component, and wherein the ratio of the reference voltages is inferior to 2 and superior to 1.4, and wherein, for a voltage applied between the first terminal and the second terminal exceeding the reference voltage of the first component, the current flowing through the first component is greater than the current flowing through the second component and the difference between the current flowing through the first component and the current flowing through the second component is increasing when the voltage applied between the first terminal and the second terminal is increasing.

* * * * *